(12) United States Patent
Speldrich

(10) Patent No.: US 7,647,835 B2
(45) Date of Patent: Jan. 19, 2010

(54) PRESSURE SENSOR STRESS ISOLATION PEDESTAL

(75) Inventor: Jamie W. Speldrich, Freeport, IL (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 11/901,750

(22) Filed: Sep. 19, 2007

(65) Prior Publication Data

US 2009/0071260 A1    Mar. 19, 2009

(51) Int. Cl.
*G01L 9/00* (2006.01)
(52) U.S. Cl. .......................... 73/754; 73/756
(58) Field of Classification Search ............... 73/756, 73/754
See application file for complete search history.

(56) References Cited

U.S. PATENT DOCUMENTS

| 5,257,547 | A | 11/1993 | Boyer |
| 5,515,732 | A * | 5/1996 | Willcox et al. ............... 73/724 |
| 5,859,759 | A | 1/1999 | Moriyama et al. |
| 5,945,605 | A * | 8/1999 | Julian et al. .................. 73/727 |
| 6,055,865 | A * | 5/2000 | Ichihashi ...................... 73/754 |
| 6,247,369 | B1 * | 6/2001 | Chapman et al. ............. 73/726 |
| 6,508,129 | B1 * | 1/2003 | Sittler ......................... 73/756 |
| 2004/0200286 | A1 | 10/2004 | Mast |
| 2006/0164203 | A1 | 7/2006 | Mast et al. |
| 2008/0016683 | A1 * | 1/2008 | Brida et al. .................. 29/739 |

* cited by examiner

*Primary Examiner*—Andre J Allen
(74) *Attorney, Agent, or Firm*—Kermit D. Lopez; Luis M. Ortiz

(57) ABSTRACT

A pressure sensor stress isolation pedestal including a pressure sensor mounted in a housing with a circuit board. The sensor is bonded to a relatively tall pedestal. The height of the pedestal creates a stiff mounting structure that isolates the sensor from mechanical stress. The pedestal is formed by making a recess or moat-like structure around the pressure sensor in the housing that supports the sensor. Preferred sensors are MEMS type Pressure Sensors.

18 Claims, 2 Drawing Sheets

PRESSURE SENSOR STRESS ISOLATION PEDESTAL

FIELD OF THE INVENTION

The present invention relates to pressure sensors. More particularly, the present invention relates to MEMS types pressure sensors that are sensitive to mechanical and thermal stress.

BACKGROUND OF THE INVENTION

There are many different elements that are attached to circuit boards and other electronic devices. Often these devices function as designed and offer no problems. Other times, however, mechanical and/or thermal stress has an adverse affect on the sensor and the output is no longer reliable. For example, MEMS type pressure sensors are quite sensitive to mechanical and thermal stress. This stress induces a shift in the null output.

Accordingly, one advantage of the present invention is to provide a device which minimizes or eliminates mechanical and/or thermal stress on sensors, particularly on sensors mounted on plastic substrates or circuit boards.

Another advantage of the present invention is to provide a means for mounting the sensor that isolates the sensor from the circuit board to reduce or eliminate stress from the circuit board to the sensor.

Other advantages will appear hereinafter.

SUMMARY OF THE INVENTION

It has now been discovered that the above and other advantages of the present invention may be obtained in the following manner. In its simplest form, the present invention comprises an improvement in the way a pressure sensor is mounted in a housing.

The invention includes a pedestal positioned in the housing to isolate the pressure sensor from mechanical stress. The pedestal includes a central column wherein the central column has a central opening to permit communication between the sensor and the pressure source. The pressure sensor is attached to the first end of the central column with an adhesive bond. An opening on the outside of said central column isolated the pedestal from the circuit board and housing structure and prevents transmission of mechanical stress.

The central column is preferably square in shape. The central opening is a cylinder and the opening on the outside of the column is a square recess.

The device preferably may include a pressure sensor cover mounted over the sensor and attached thereto by an adhesive.

The device may also be incorporated into a housing with a seal placed between the housing and the first end of the pedestal. A preferred sealing means is an O-ring seal. An alternative means of sealing is adhesive. Other seals are also contemplated.

The device may also a pressure sensor support mounted between the sensor and the central column, wherein the second end is bonded to the pressure sensor using an adhesive.

BRIEF DESCRIPTION OF THE DRAWINGS

For a more complete understanding of the invention, reference is hereby made to the drawings, wherein like numbers refer to like elements, and in which.

DETAILED DESCRIPTION OF THE PREFERRED EMBODIMENT

Figure 1:
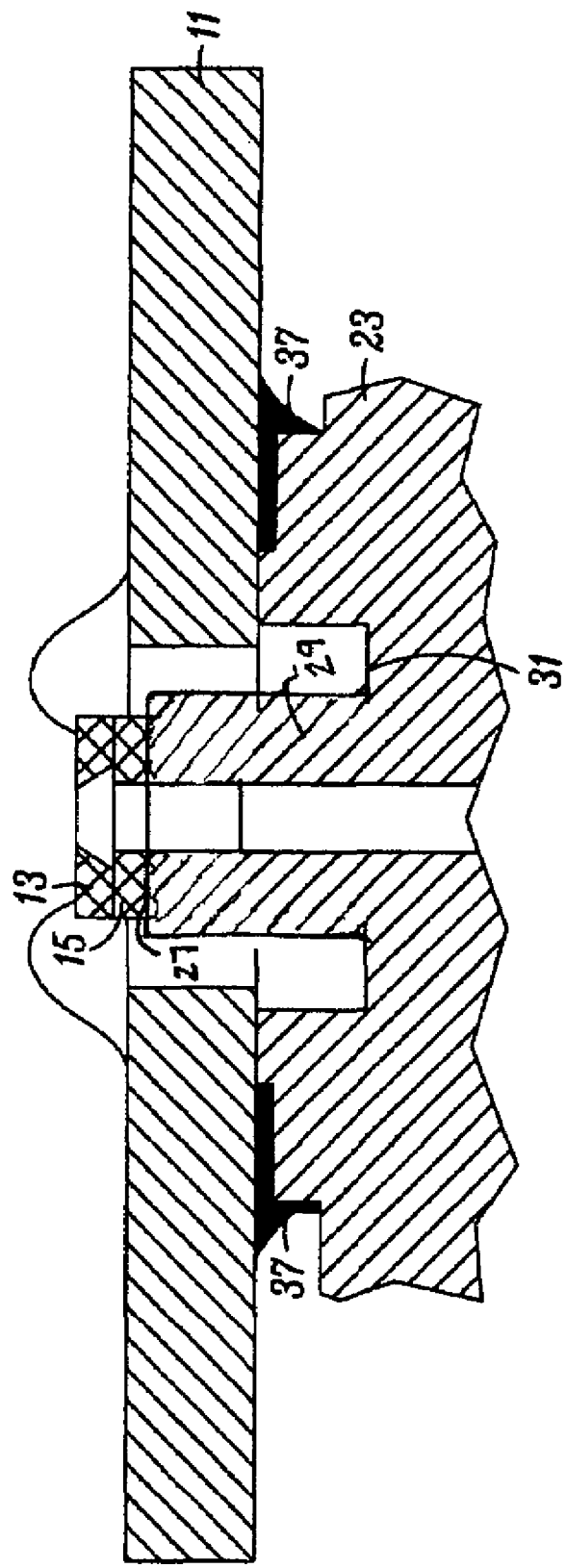
FIG. 1 is a sectioned side elevational view of one embodiment of the present invention.

As shown in the drawings, the device of this invention, 10 generally, show a housing 23 which mounts the sensor 13 on the central column 29 of housing 23. Sensor 13 may be supplied with an optional sensor support 15. As can be seen, the central column of housing 23 is square, having a center hole for communication between the sensor and pressure source being measured, The central portion of housing 23 also have recesses 31 which, in conjunction with central column 29, isolates stress from circuit board 11 or housing 23, or any other substrate that mounts a pressure sensor. Recess 31 is a square space around the square central column 29. Adhesive 37 bonds the circuit board 11 to the housing 23. Adhesive 27 bonds sensor 13 to the stress isolation pedestal central column 29 and therefore sensor 13 is isolated from adverse stress.

Figure 2:
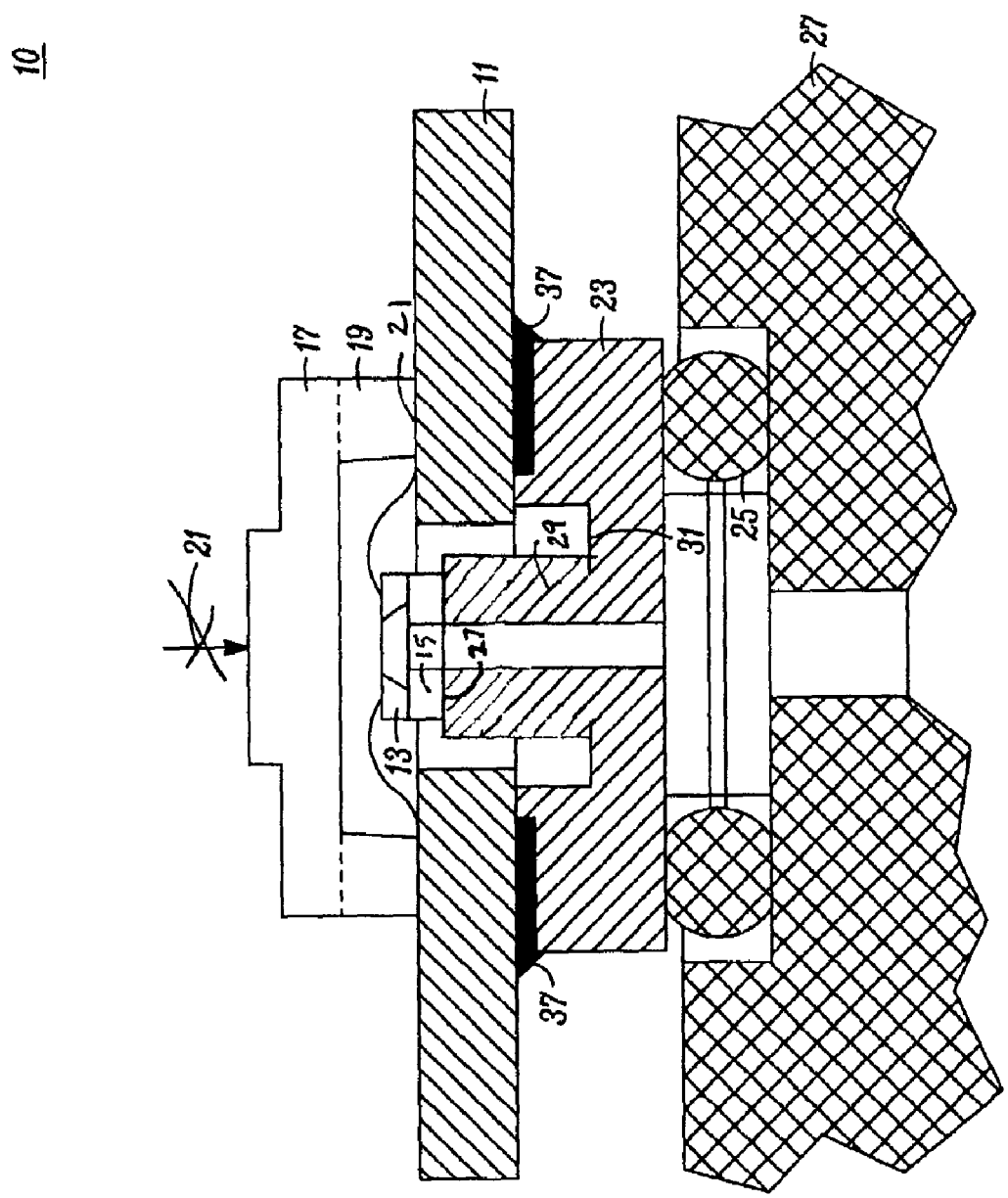
FIG. 2 is an alternative embodiment with an O-ring seal to a frame mount.

FIG. 2 illustrates an alternative embodiment in which elements from FIG. 1 are incorporated into a second level structure. Circuit board 11 includes a pressure sensor 13 as part of the function of the circuit board. The sensor 13 is placed on an optional sensor support 15 of conventional design. A cover 17 is attached over the sensor by adhesive 21 which bonds cover 17. Cover 17 also has a vent area 19, which is also conventional in design.

The present invention makes use of a pedestal 29 to isolate the sensor from outside stresses, such as from the substrate such as a circuit board 11 or other component, or when the whole device is mounted. Pedestal 29 and the housing 23 is mounted on a larger housing support 27 using a seal 25. The preferred seal is an O-ring seal 25, as shown in FIG. 2, but other conventional seals such as adhesives are also used.

While particular embodiments of the present invention have been illustrated and described, it is not intended to limit the invention, except as defined by the following claims.

The invention claimed is:

1. A pressure sensor device mounted in a housing on a PC board, comprising:
   a housing;
   a PC board having a pressure sensor mounted thereon; and
   a pedestal positioned between said housing and said PC board, said pedestal having a first end mounted on said housing and a second end bonded to said pressure sensor, said pedestal having a central column forming said second end, said central column having a central opening for communication between said pressure sensor and said housing and an opening on the outside of said central column isolating said pedestal from said PC board thereby preventing the transmission of mechanical and thermal stresses.

2. The device of claim 1, which further includes sealing means between said housing and said first end of said pedestal.

3. The device of claim 2, wherein said sealing means is an "o" ring seal.

4. The device of claim 1, wherein said central column is cylindrical and said opening on the outside of said central column is an annular space which isolates stresses from said housing and said PC board.

5. The device of claim 4, wherein said device further includes a pressure sensor cover mounted over said pressure sensor and attached thereto by clamp means.

6. The device of claim 1, which further includes a pressure sensor support mounted between said pressure sensor and said central column, wherein said second end is bonded to said pressure sensor using an adhesive.

7. A pressure sensor device mounted in a housing on a PC board, comprising:
 housing means for mounting a PC board;
 a PC board having a pressure sensor mounted thereon; and
 pedestal means for mounting said pressure sensor and positioned between said housing means and said PC board, said pedestal means having a first end mounted on said housing and a second end bonded to said pressure sensor, said pedestal means having a central column means for isolating said pedestal means from said PC board, said central column means forming said second end, said central column means having a central opening for communication between said pressure sensor and said housing means and an opening on the outside of said central column means isolating said pedestal means from said PC board thereby preventing the transmission of mechanical and thermal stresses.

8. The device of claim 7, which further includes sealing means between said housing means and said first end of said pedestal means.

9. The device of claim 8, wherein said sealing means is an "o" ring seal.

10. The device of claim 7, wherein said central column means is cylindrical and said opening on the outside of said central column means is an annular space which isolates stresses from said housing and said PC board.

11. The device of claim 10, wherein said device further includes a pressure sensor cover mounted over said pressure sensor and attached thereto by clamp means for holding said pressure sensor cover on said device.

12. The device of claim 7, which further includes a pressure sensor support mounted between said pressure sensor and said central column means, wherein said second end is bonded to said pressure sensor using an adhesive.

13. A pressure sensor device mounted in a housing on a PC board, the PC board having a pressure sensor mounted thereon, the device comprising:
 a pedestal positioned between said housing and said PC board, said pedestal having a first end mounted on said housing and a second end bonded to said pressure sensor, said pedestal having a central column forming said second end, said central column having a central opening for communication between said pressure sensor and said housing and an opening on the outside of said central column isolating said pedestal from said PC board thereby preventing the transmission of mechanical and thermal stresses.

14. The device of claim 13, which further includes sealing means between said housing and said first end of said pedestal.

15. The device of claim 14, wherein said sealing means comprises an "o" ring seal.

16. The device of claim 13, wherein said central column is cylindrical and said opening on the outside of said column is an annular space which isolates stresses from said housing and said PC board.

17. The device of claim 13, wherein said device further includes a pressure sensor cover mounted over said pressure sensor and attached thereto by clamp means.

18. The device of claim 13, which further includes a pressure sensor support mounted between said pressure sensor and said central column, wherein said second end is bonded to said pressure sensor using an adhesive.

* * * * *